United States Patent [19]

Nakano

[11] Patent Number: 5,268,958
[45] Date of Patent: Dec. 7, 1993

[54] METHOD FOR ALLOCATING INCOMING-CALL TO EXTENSION TELEPHONE SETS IN PRIVATE BRANCH EXCHANGE AND PRIVATE BRANCH EXCHANGE HAVING AUTOMATIC INCOMING-CALL ALLOCATING FUNCTION

[75] Inventor: Kazuo Nakano, Niiza, Japan

[73] Assignee: Kabushiki Kaisha Toshiba, Kawasaki, Japan

[21] Appl. No.: 839,073

[22] Filed: Feb. 24, 1992

Related U.S. Application Data

[63] Continuation of Ser. No. 505,125, Apr. 4, 1990, abandoned.

[30] Foreign Application Priority Data

Apr. 6, 1989 [JP] Japan .................................... 1-87756

[51] Int. Cl.⁵ ........................................... H04M 3/46
[52] U.S. Cl. .................... 379/211; 379/233; 379/265; 379/142
[58] Field of Search ................ 379/142, 201, 210-212, 379/265-266, 233; 370/110.1

[56] References Cited

U.S. PATENT DOCUMENTS

| | | | |
|---|---|---|---|
| 4,277,649 | 7/1981 | Sheinbein | 379/201 |
| 4,696,028 | 9/1987 | Morganstein et al. | 379/212 X |
| 4,723,273 | 2/1988 | Diesel et al. | 379/142 X |
| 4,893,325 | 1/1990 | Pankonen et al. | 379/210 X |
| 5,029,196 | 7/1991 | Morganstein | 379/67 |

FOREIGN PATENT DOCUMENTS

| | | | |
|---|---|---|---|
| 53-136907 | 11/1978 | Japan | 379/211 |
| 63-217862 | 9/1988 | Japan | 379/211 |
| 1-149650 | 6/1989 | Japan | 379/210 |

OTHER PUBLICATIONS

IBM Technical Disclosure Bulletin, vol. 25, No. 7A Dec. 1982 entitled "Unanswered Call Diverter" by Brady et al.
IBM Technical Disclosure Bulletin, vol. 25, No. 4 Sep. 1982, entitled "Busy Call Diverter" by Brady et al.
Andrew Waite, "Beyond ISDN Theory", Inbound-/Outbound Magazine Dec. 1989, pp. 20-27.
Kevin G. Hegebarth, "ANI is the key to unlock advanced network services", Telephony Magazine, Nov. 14, 1988, pp. 64-68.
"Data Plus Shows Off Enhanced Automatic Call System", Washington Technology issue May 28-Jun. 10, 1987, vol. 2 Nov. 5, p. 8.

Primary Examiner—James L. Dwyer
Assistant Examiner—Ahmad F. Matar
Attorney, Agent, or Firm—Finnegan, Henderson, Farabow, Garrett & Dunner

[57] ABSTRACT

In an integrated services digital network (ISDN), a caller number indicative of the telephone number of a caller can be usually attached in a call data. In a private branch exchange according to the present invention, the caller number of a caller and the extension number or numbers of an extension telephone set or sets to which the call is desired to be directly sent from the caller are previously registered in a suitable memory table in a predetermined correlation, so that when the private branch exchange receives a call from the ISDN, it retrieves the table to check whether or not the received call is previously registered in the table in the form of a caller number. When the call is registered one, the call is preferentially allocated to one or ones of the extension telephone sets having one or ones of the extension numbers associated with the caller number of the received call. The number registration in the table may be carried out through each of the extension telephone sets.

25 Claims, 8 Drawing Sheets

FIG.6

| DN | IDLE=0, BUSY=1 |
|---|---|
| 1 | 0 |
| 2 | 1 |
| 3 | 1 |
| 4 | 0 |
| ⋮ | ⋮ |

METHOD FOR ALLOCATING INCOMING-CALL TO EXTENSION TELEPHONE SETS IN PRIVATE BRANCH EXCHANGE AND PRIVATE BRANCH EXCHANGE HAVING AUTOMATIC INCOMING-CALL ALLOCATING FUNCTION

This application is a continuation of application Ser. No. 07/505,125 filed Apr. 4, 1990 (now abandoned).

BACKGROUND OF THE INVENTION

1. Field of the Invention

The present invention relates to a method for allocating a call received from such a network as an integrated services digital network (ISDN) to a plurality of extension telephone sets provided in private branch exchange connected to the ISDN as well as a private branch exchange having a function of automatically allocating the call to desired one of the extension telephone sets. More particularly, the present invention relates to an extension telephone allocating method as well as an arrangement of a private branch exchange, which allows direct sending of a call received from the network to a desired one of the extension telephone sets.

2. Description of the Related Art

Generally speaking, an electronic private branch exchange connected to the ISDN or the like is arranged so that, when the exchange receives an incoming call from a central office line (public line), users can arbitrarily set a relay board or an extension number (indicative the telephone number of an extension telephone set, which is also referred to as a directory number (DN) as its target call receiver with respect to each of port numbers of the central office line. The call allocating system to the extension telephone sets is also provided with various service functions including an automatic call distribution (ACD) and dial-in.

In the ACD system, for example, at the time of setting up the system (at the time of setting initial conditions), extension numbers indicative of the telephone numbers of a plurality of extension telephone sets are previously set in an ACD group as associated with the extension telephone sets and the ACD group is set as a call receiver for a specific central-office line port number. With such an arrangement, when an incoming call appears at the specific central-office line port number, the incoming call can be sent to one of the extension telephone sets belonging to the ACD group being assigned as the call receiver. In this case, the private branch exchange selectively controls the call receiver in such a manner that the received call can be uniformly distributed and sent to the respective extension telephone sets belonging to the ACD group.

In the ACD system, however, though it is possible to assign a call receiver in a group unit as mentioned above, it is not always possible that a received call is sent to a desired call receiver. For this reason, when the call is sent to one of the extension telephone sets other than the desired one, this requires a wrong call receiver to conduct the following call informing work. That is, the wrong call receiver checks the extension number of the extension telephone set which the caller assigns and transfers the call to the right extension telephone corresponding to the right extension number. Only after the troublesome call informing work, the caller can talk with the desired party.

In the dial-in system, on the other hand, the users previously set specific extension numbers for respective central-office line port numbers. And when the system receives an incoming call from the central office line, the incoming call is directly sent to an extension telephone set having a specific extension number.

In this way, in the dial-in system, it is possible to specify the call receivers to some extent. However, because the number of extension telephone sets is usually larger than the number of central office lines in a private branch exchange, it is impossible for the central office lines to be allocated to all the extension telephone sets in a 1:1 relation therebetween. Thus, even in the dial-in system, when the system receives an incoming call, it is not always possible that the received call is sent to a desired call receiver. For this reason, when the call is sent to one of the extension telephone sets other than the desired one, this requires the troublesome call informing work of the wrong call receiver as mentioned above.

As explained above, in the electronic private branch exchange, the call received from the central office line can be sent to any of the extension telephone sets belonging to the specific ACD group or to the preset extension telephone sets for each central-office line port number, but the call cannot be always sent to the desired extension telephone set. In many cases, this involves such troublesome call informing work as mentioned above. In addition, the caller must wait during the call informing work, while the wrong call receiver must troublesomely check the extension number of the right extension telephone set specified by the caller and transfer the call to the right extension telephone set. For this reason, improvements in the extension telephone allocating method for the call from the central office line have been in strong demand.

SUMMARY OF THE INVENTION

In view of such circumstances, it is an object of the present invention to provide a method for allocating an incoming call to extension telephone sets in a private branch exchange and a private branch exchange having a function of automatically allocating an incoming call, in which the incoming call can be preferentially sent to one of the extension telephone sets specified by a caller, the troublesome call informing work, which occurs in the prior art, can be reduced to a large extent and thus a caller's waiting time can be satisfactorily shortened.

In accordance with the present invention, in order to attain the above object, on assumption that a network can add a caller number indicative of the telephone number of a caller in a calling data set, a caller number of an arbitrary caller and an extension number of an extension telephone set as a desired direct call receiver are previously registered in a suitable memory table within a private branch exchange in a predetermined relationship therebetween so that when the private branch exchange receives a call from a central office line, the exchange determines from the table whether or not the received call is one already registered in the table as a caller number. When the received call is one already registered in the table, the private branch exchange preferentially allocates the received call to one of extension telephone sets which has been registered in the table as being associated with the received call.

Accordingly, so long as a user previously registers the caller number of a specific party or of a party to frequently communicate with in the above table as associated with the extension number indicative of the extension telephone number of the associated extension telephone set with respect to each of the extension telephone sets provided in the private branch exchange, when the exchange receives a call from one of the registered parties, the received call can be sent directly to one of the extension telephones having one of the already registered extension numbers associated with the caller number of the received call. At least in such a case, such call informing work as mentioned above can be eliminated and thus it can be prevented that the caller is kept waiting during the call informing work.

When the extension telephone having the received call sent thereto is busy, when the caller number of the received call from the central office line is not registered in the table, or when the call itself received from the central office line has not any identifiable caller number, the call destination is determined according to the aforementioned ACD system or the like. Though such situations may rarely occur, the call informing work to the right call receiver can be reduced to a large extent and therefore the caller waiting time can be also remarkably shortened as a whole.

The number registration in the table may be carried out through each of the extension telephones or may be carried out through a predetermined terminal unit assigned for the number registration.

BRIEF DESCRIPTION OF THE DRAWINGS

FIG. 6 schematically shows an exemplary extension-telephone state table which a controller of the exchange of the embodiment uses to control extension telephone sets;

DESCRIPTION OF THE PREFERRED EMBODIMENT

Figure 1:
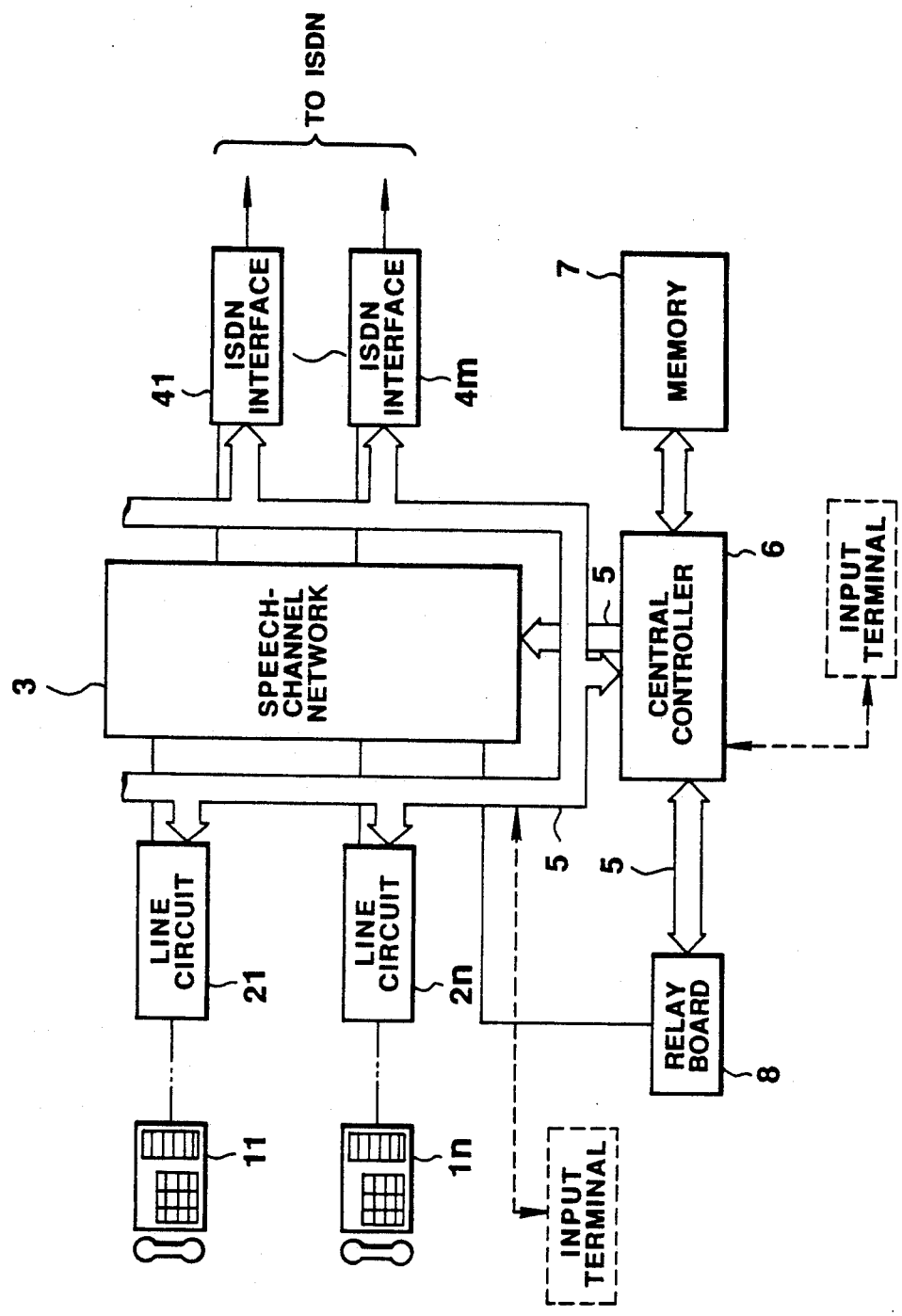
FIG. 1 is a block diagram showing an embodiment of a private branch exchange in accordance with the present invention.

Referring to FIG. 1, there is shown an arrangement of a private branch exchange having an automatic incoming-call allocating function in accordance with an embodiment of the present invention.

The arrangement of the private branch exchange of the present invention will first be explained.

In FIG. 1, extension telephone sets of an electronic key telephone (EKT) type 11 to 1n are connected to a speech-channel network 3 through associated exclusive exchange line circuits 21 to 2n respectively. The speech-channel network 3 is connected to an ISDN through ISDN interface circuits 41 to 4m which support layers 1 to 3.

The speech-channel network 3, line circuits 21 to 2n and ISDN interface circuits 41 to 4m are further connected through a control data bus line 5 to a central controller 6. The central controller 6 synthetically controls the switching operation of the private branch exchange while performing transfer of necessary everytime data between a memory 7, speech-channel network 3, line circuits 21 to 2n and ISDN interface circuits 41 to 4m in such a manner that speech channels are established between the extension telephone sets 11 to 1n or between the extension telephone sets 11 to 1n and the ISDN under the switching control of the central controller 6 over the speech-channel network 3.

Similarly, a relay board 8 is connected through the control data bus line 5 to the central controller 6 so that speech channels are established between the relay board 8 and line circuits 21 to 2n or between the relay board 8 and ISDN interface circuits 41 to 4m under the switching control of the central controller 6 over the speech-channel network 3.

The ISDN interface circuits 41 to 4m support layers 1 to 3 (network layer) as mentioned above to control both of the layer 1 (physical layer) and the layer 2 (data link layer), to connect the B channel of the ISDN and the speech-channel network 3, and to transfer data of the layer 3 between the D channel of the ISDN and the central controller 6.

Explanation will next be made as to the automatic incoming-call allocating function which will be carried out each time the private branch exchange of the present embodiment receives an incoming call.

In the ISDN, a caller number as the telephone number of a caller can be usually attached to a calling data set. Thus, with the private branch exchange of the present embodiment, a caller number and an extension telephone number of one of the extension telephone sets to which the caller desires to directly send a call, are previously registered in the memory 7 as associated with each other in a predetermined relationship, so that when the exchange receives a call from the ISDN, the central controller 6 first checks whether or not the received call is the one having the caller number already registered in the memory 7. When the received call is one already registered, one of the extension numbers associated with the caller telephone number is extracted, an associated one of the line circuits is selected, and the associated switching control of the speech-channel network 3 corresponding to the extracted extension telephone number is carried out under the central controller 6, whereby the received call is preferentially allocated to the extension telephone set corresponding to the extracted extension telephone number. In this case, the telephone number registration to the memory 7 can be realized through the extension telephone sets 11 to 1n.

Figure 2:
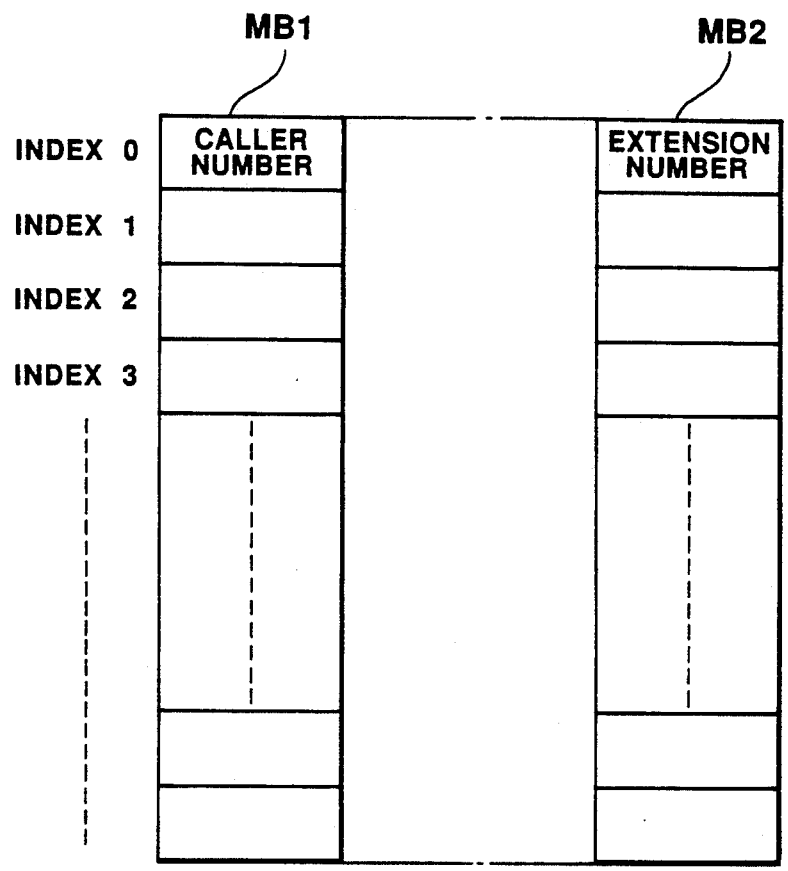
FIG. 2 is a schematic table stored in a memory in FIG. 1, showing relationships between caller numbers and extension telephone numbers.

Shown in FIG. 2 is an exemplary table in which relationships between caller numbers and extension numbers are registered.

More specifically, in FIG. 2, a memory block MB1 is an area in which the above caller numbers are stored and registered and a memory block MB2 is an area in which the above extension numbers are stored and registered, the caller numbers registered in the memory block MB1 being associated with the extension numbers registered in the memory block MB2 by table indexes INDEXES (i) (i=0, 1, . . . ). When the private branch exchange receives an incoming call from the ISDN, the central controller 6 reads the caller number of the call from the layer 3 message. When the same caller number as that read from the layer 3 message is already registered in the memory block MB1, the central controller 6 reads out from the table one of the extension numbers already registered in the memory block MB2 which has the same index number i as the caller number, and performs switching control over the line circuits and speech-channel network 3 to thereby cause the received call to be sent to an associated one of the extension telephone sets having the read extension number.

The present embodiment is also arranged so that the caller numbers and the extension numbers can be freely registered in the memory blocks MB1 and MB2 respectively through predetermined registering procedures via the extension telephone sets 11 to 1n.

Figure 3:
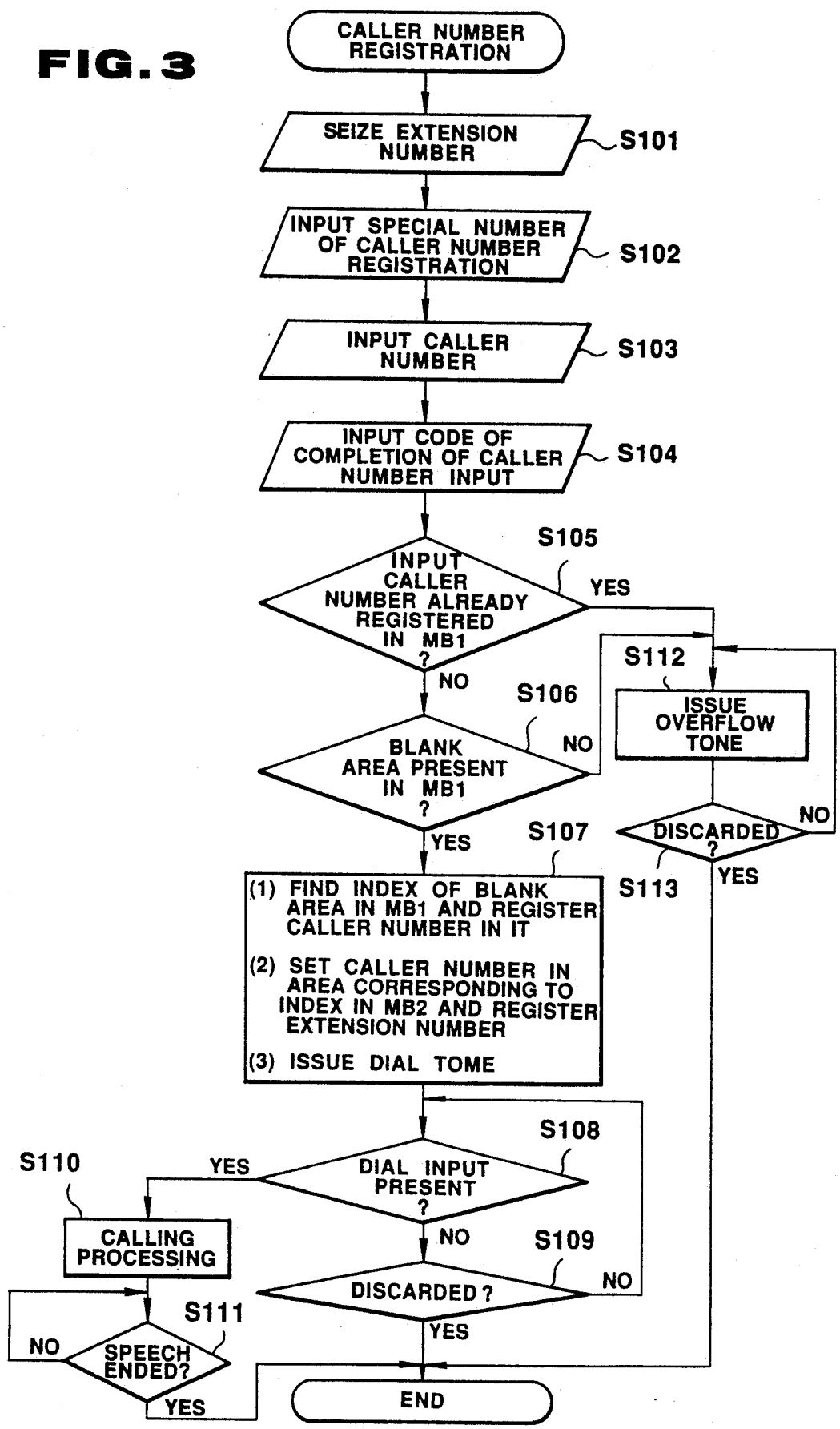
FIG. 3 is a flowchart exemplifying a caller/extension telephone number registering procedure to be executed in the private branch exchange of the embodiment.

FIG. 3 shows an example of processing for registration of the caller numbers and the extension numbers which the private branch exchange (more accurately, the central controller 6) executes in response to the predetermined registering procedures based on the extension telephone sets 11 to 1n.

The registering procedures of the caller/extension numbers under the central controller 6 will be detailed by referring to FIG. 3.

Assume now that it is desired to assign an extension telephone set as the receiver of a call from a specific caller. Then, when the user of the extension telephone set to be assigned as the receiver depresses a directory number (DN) button thereon or picks up the handset thereof to put the telephone in its off-hook state, inputs a special number for the number registration, for example, "#10" (to which end, a number usually not used being previously set), inputs the caller number (telephone number) of the specific caller, and then inputs a specific code number indicative of the completion of the registering procedures, for example, "#10" (as which code number a number usually not used being also previously set and being capable of being the same number as the special number mentioned above) by depressing the corresponding key buttons; the central controller 6 starts its caller/extension number registering processing in such a manner as mentioned in the following.

(1) The central controller 6 seizes the number set as the extension telephone number (directory number DN) of the extension telephone set in question on the basis of the depressed data of the DN button or the off-hook or on-hook control data (step S101 in FIG. 3).

(2) The central controller 6, when receiving the caller number, is put in its caller-number registration mode (step S102 in FIG. 3) and accepts the caller number (step S103 in FIG. 3). The accepted caller number is temporarily stored in, e.g., a register (not shown) incorporated in the central controller 6.

(3) After recognizing the completion of the registering operation on the basis of the input of the code number indicative of the above registration completion (step S104 in FIG. 3), the central controller 6 checks whether the received caller number is already registered in the memory block MB1 of the aforementioned table (memory 7) (step S105 in FIG. 3).

(4) When the received caller number is not registered, the central controller 6 further checks whether or not an area for the registration of the new caller number is present in the memory block MB1 (step S106 in FIG. 3).

(5) When there is such an area in the memory block, the central controller 6 determines that the caller number can be newly registered. In this case, the controller finds an index number i for the blank area in the memory block MB1, registers the then received caller number (temporarily stored in the register) in that area, and also registers the above seized (refer to step S101 in FIG. 3) extension number in the area having the same index number in the memory block MB2. At the same time, the central controller 6 sends a dial tone to the handset of the extension telephone set in question to inform the user of the extension telephone set of the fact that the registering processing has been completed (step S107 in FIG. 3).

(6) When the user of the extension telephone set, who recognized the information by the dial tone, discards the subsequent speech by finishing the operation as it is or by hooking the handset on the telephone set to put the telephone in the on-hook state (steps S108 and S109 in FIG. 3), this also terminates the caller/extension number registering processing of the central controller 6 at this time.

(7) When the user of the extension telephone set, who recognized the information (step S107 in FIG. 3) by the dial tone, further asks the speech to the party through dialing input (step S108 in FIG. 3), the central controller 6 is shifted to assigned-party calling processing (step S110 in FIG. 3). When the speech based on the assigned-party calling is terminated (step S111 in FIG. 3), the central controller 6 terminates its caller/extension number registering processing.

(8) When the central controller 6 recognizes that the received caller number is already registered in the memory block MB1 in the above processing (3) (step S105 in FIG. 3), or when the central controller 6 recognizes that there is no blank area in the memory block MB1 in the above processing (4) (step S106 in FIG. 3); the central controller 6 determines that it is impossible to register the received caller number and sends an overflow tone to the handset of the extension telephone set in question (step S112 in FIG. 3).

(9) In this case, when the user of the extension telephone set, who receives the information by the overflow tone, discards the subsequent operation by finishing the operation as it is or by hooking the handset on the telephone set to put the telephone in the on-hook state (step S113 in FIG. 3), the central controller 6 finishes the caller/extension number registering processing.

In this way, in the caller/extension number registering operation of the central controller 6 in the present embodiment, the extension number of the extension telephone set through which the caller number is input, is automatically registered in the table (memory 7) in association with the input caller number. In addition, the normal termination of the registration of these extension and caller numbers causes the central controller 6 to issue a dial tone signal to the extension telephone set in question, whereby the extension telephone set is automatically shifted to the calling able state.

Next, explanation will be made as to the processing and operation of the private branch exchange of the present embodiment in an incoming-call reception mode.

Prior to this, explanation will first be made as to the configuration of caller number data elements included in the layer 3 data (SETUP message) in the ISDN by referring to FIG. 4.

Figure 4:
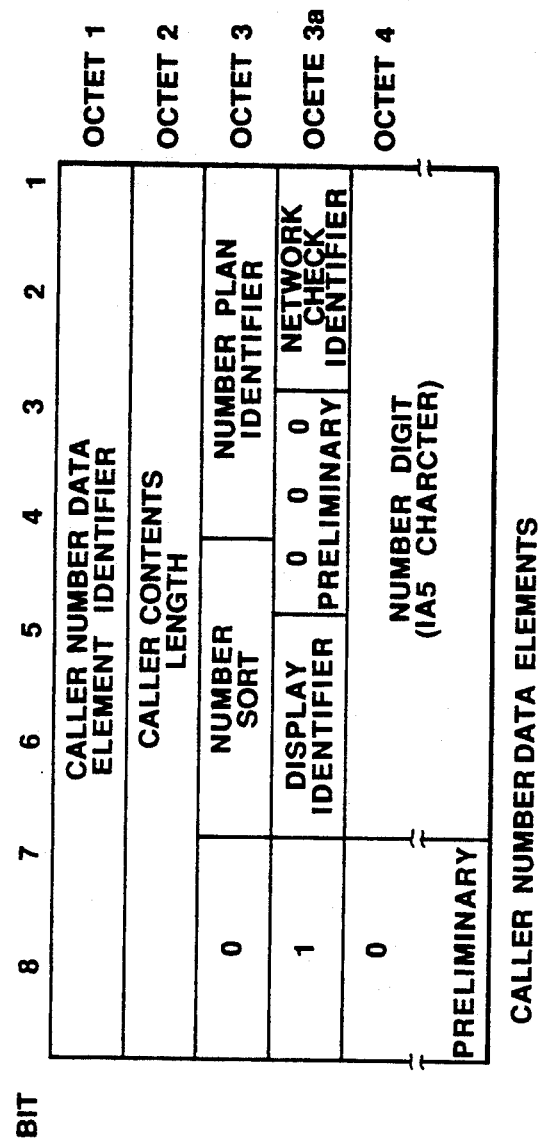
FIG. 4 schematically shows an example of the configuration of caller number data elements included in a layer 3 data (SETUP message) in an ISDN.

The processing of the present embodiment is based on the major assumption that such a "caller number data element identifier" as shown in FIG. 4 is present in the layer 3 data (SETUP message) indicative of a set request from the ISDN.

When the "caller number data element identifier" is present in the SETUP message, the "caller number data element identifier" is located at octet 1 of the caller number data elements. When the "caller number data element identifier" is present, there is present octet 4 in which the number digits of the caller number are expressed in terms of IA5 character codes, if the eighth bit of octet 3 in the caller number data elements is "1" and a caller number contents length at octet 2 is 2 or more, or if the eighth bit of octet 3 is "0", a display identifier at octet 3a is being able to display ("00"), and the caller number contents length of octet 2 is 3 or more.

To this end, the present embodiment is arranged so that the central controller 6, when determining the presence of the "caller number data element identifier" in the SETUP message, checks the presence or absence of octet 4 in the caller number data elements and the central controller 6, when determining the presence of octet 4, also reads out the caller number from octet 4.

Figure 5:
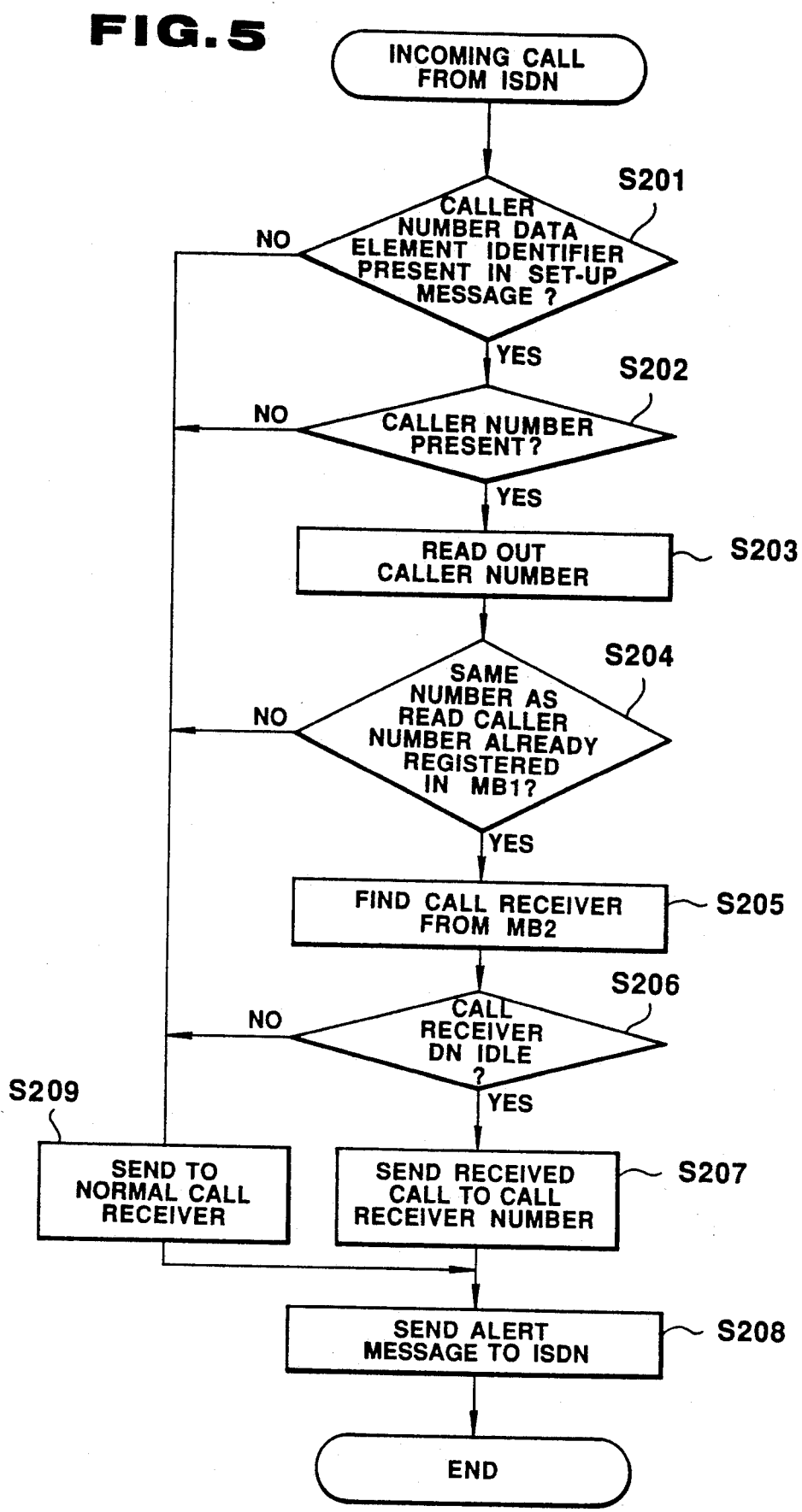
FIG. 5 is a flowchart exemplifying an automatic incoming-call allocating procedure of the exchange of the embodiment to be executed to an extension telephone set.

FIG. 5 shows an example of the automatic incoming-call allocating operation of the private branch exchange of the present embodiment in the incoming-call reception mode to be carried out based on the retrieval and reading operation of such a caller number. The automatic incoming-call allocating procedure of the central controller 6 will be detailed by referring to FIG. 5.

Assume now that the private branch exchange receives an incoming call from the ISDN and the set request layer 3 data (SETUP message) is transferred through the ISDN interface circuits 41 to 4m to the central controller 6. Then, the central controller 6 receiving the SETUP message starts the incoming-call processing operation in such a manner as mentioned below.

(1) The central controller 6, when receiving the SETUP message, checks the presence or absence of the "caller number data element identifier" in the received SETUP message (step S201 in FIG. 5).

(2) When the central controller 6 determines the presence of the "caller number data element identifier" in the SETUP message, the controller further checks whether or not octet 4 is present in the caller number data elements, that is, whether or not the associated caller number is present (step S202 in FIG. 5).

(3) The determination of presence of octet 4 causes the central controller 6 to read out the coded caller number from octet 4 (step S203 in FIG. 5).

(4) The central controller 6 checks whether or not the same caller number as the read caller number is already registered in the memory block MB1 of the aforementioned table (memory 7) (step S204 in FIG. 5).

(5) When the same caller number is already registered, the central controller 6 finds an index number i for an area in which the corresponding caller number is already registered in the memory block MB1 and reads out the extension number of the extension telephone set allocated as the target call receiver from the area corresponding to the found index number i in the other memory block MB2 (step S205 in FIG. 5).

Figure 6:
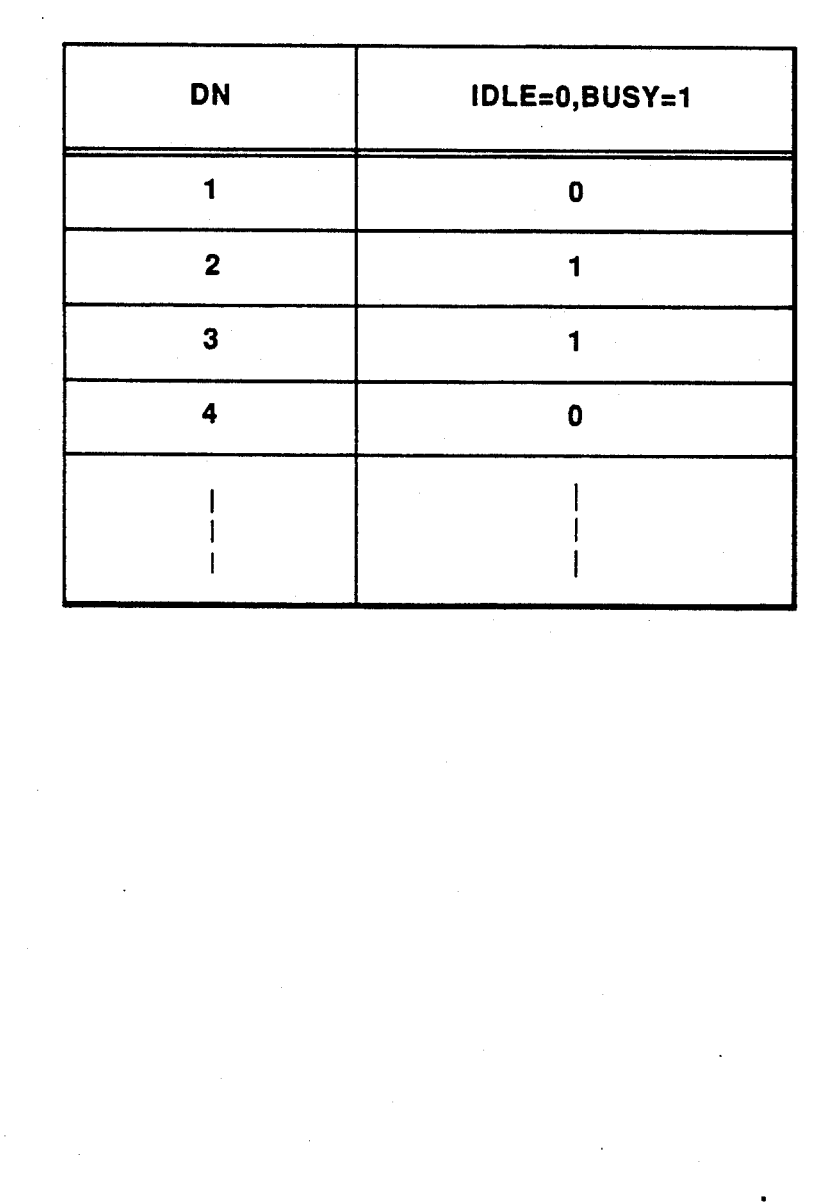

(6) Next, the central controller 6 examines whether the extension telephone set having the read extension number is idle (step S206 in FIG. 5). In this connection, control of the above extension telephone state is effected on the basis of such a state control table exemplified in FIG. 6. In the electronic private branch exchange for the present invention to handle, such a table is usually set previously in the memory 7 or in the central controller 6 itself so that the central controller 6 judges the idle or busy state of the respective extension telephone sets on the basis of the presence or absence of such flags as exemplified in FIG. 6.

(7) When the central controller 6 determines that the extension telephone set in question is idle, this causes the incoming call to be sent to the corresponding extension telephone set (step S207 in FIG. 5).

(8) The central controller 6 causes a layer 3 data (ALERT message) indicative of the calling operation of the target call receiver to be sent to the ISDN through the ISDN interface circuits 41 to 4m (step S208 in FIG. 5), thus terminating the automatic incoming-call allocating operation of the central controller 6. Through such processing operation, the incoming call from the ISDN is automatically sent to the extension telephone set having the extension number previously registered as associated with the caller number.

(9) In the event where the central controller 6 receives an incoming call from the ISDN but the "caller number data element identifier" is absent in the SETUP message or the same caller number as that of the incoming call is not registered in the memory block MB1 or the extension telephone set allocated as the target call receiver in the memory block MB2 is not idle, the central controller 6 causes the incoming call to be sent to a previously set call receiver such as a relay board or a specific extension telephone set (step S209 in FIG. 5). In this case, the call receiver may be selected and determined based on the aforementioned automatic call distribution (ACD) system or the like.

As has been explained above, in the present embodiment, so long as the caller number of a specific party or of a party to frequently communicate with is previously registered in association with corresponding each one of the extension telephone sets, a call from the registered party will be directly sent to the extension telephone set having an extension number already registered as associated with the caller number. In this case, at least the need for such an intermediate call informer as mentioned earlier can be eliminated and thus it can be prevented that the caller is kept waiting during the call informing time. In addition, although the call receiver is determined very rarely through the above operation (9) (refer to step S209 in FIG. 5), the incoming-call informing work can be reduced to a large extent and thus caller's waiting time can be also shortened greatly as a whole.

The foregoing embodiment has a disadvantage that when a received caller number is already registered in the memory block MB1 of the aforementioned table (memory 7) in the caller/extension number registering operation, even the presence of a blank area in the memory block MB1 causes sending of the overflow tone and disables the subsequent number registering operation (refer to steps S105, S107 and S112 in FIG. 3). However, such a disadvantage can be eliminated, for example, when the present invention is arranged so that such processing procedure is also carried out in accordance with such a flowchart as shown in FIG. 7.

Figure 7:
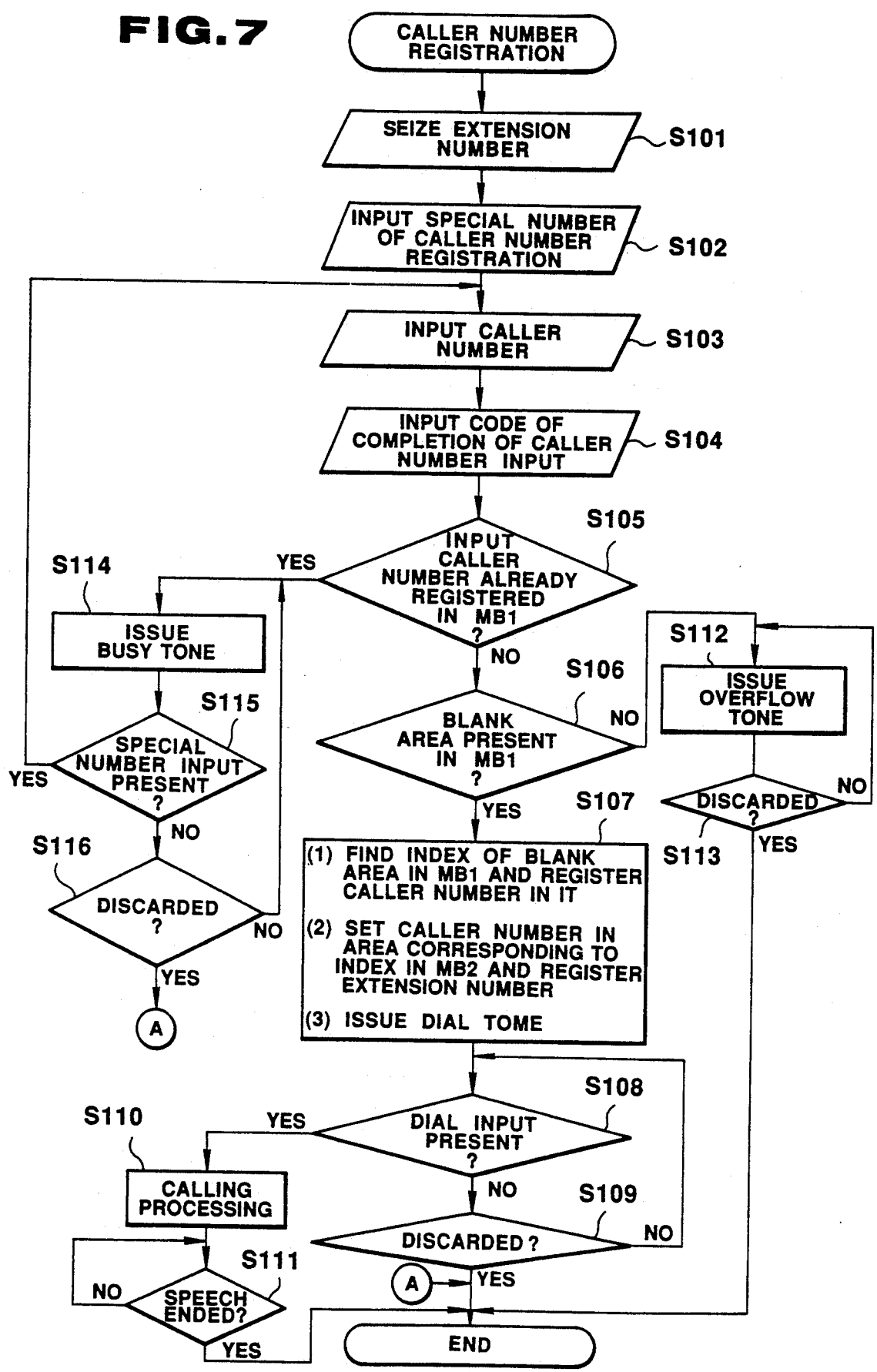
FIG. 7 is a flowchart exemplifying another example of the caller/extension telephone number registering procedure of FIG. 3.

More in detail, in such a procedure as shown in FIG. 7, when the received caller number is already registered in the memory block MB1 (step S105 in FIG. 7), the central controller 6 issues a busy tone (step S114 in FIG.

7); and thereafter only when the aforementioned special number is again inputted (step S115 in FIG. 7) while not discarded (step S116 in FIG. 7), an input operation for another caller number (refer to step S103 in FIG. 7) becomes possible. Such an arrangement, in the event where an input caller number is already registered in the memory block MB1 and the user tries to register another caller number, can eliminate the need for troublesomely depressing the DN button again or for repetitively setting the telephone in the on-hook and off-hook states. In FIG. 7, steps having substantially the same processing as those in FIG. 3 are denoted by the same reference symbols and explanation thereof is omitted.

It occurs in some cases that it is desired to register a plurality of extension telephone sets with respect to the single caller number though the same caller number is doubly registered in the memory block MB1. For example, one of such cases is that a plurality of persons take charge of a single party (caller) such as a company T and use individually different extension telephone sets. In this case, when the private branch exchange receives a call from the company T, the private branch exchange desirably executes its incoming-call processing operation in accordance with the following procedure. That is:

The received call is first allocated to one of the extension telephone sets which corresponds to one of a plurality of extension telephone numbers previously registered as associated with the caller number of the company T and also in the uppermost area in the aforementioned table. If the allocated extension number is busy then the received call is allocated to one of the extension telephone sets registered in the next higher area in the table, and so on.

Figure 8:
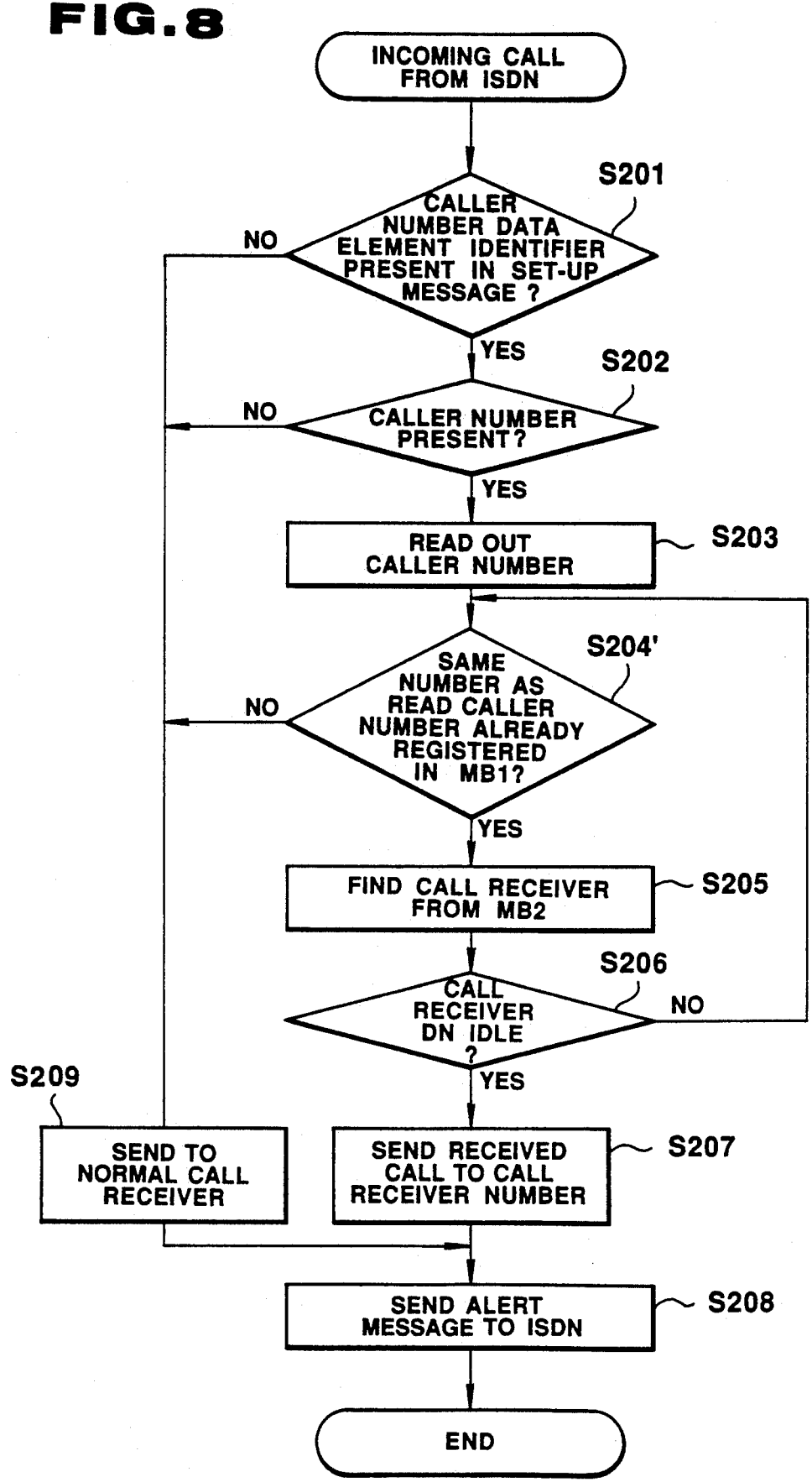
FIG. 8 is a flowchart exemplifying another example of the automatic incoming-call allocating procedure of FIG. 5 to the extension telephone set.

To this end, for example, the caller/extension number registering operation is carried out in accordance with such a flowchart as shown in FIG. 3 but with the step S105 removed, and the incoming-call processing operation is carried out in such a manner as exemplified in FIG. 8.

More in detail, when the step S105 is deleted in FIG. 3, the overlapped registration of the same caller number becomes possible. In addition, when the first allocated extension telephone set as the first call receiver is busy (step S206 in FIG. 8), the above desirable incoming-call processing operation can be realized by executing the table retrieval (step S204 in FIG. 8) again with regard to the same caller number (more accurately, by sequentially indexing and executing the corresponding extension numbers based on the scanning operation of the caller number from the upper registration area of the table) as shown in FIG. 8. Even in FIG. 8, substantially the same processing steps as those in FIG. 5 are denoted by the same reference symbols and explanation thereof is omitted.

In the foregoing embodiment, whether or not the incoming call is sent to the designated extension telephone set has been determined by whether or not the caller number in the SETUP message coincides with that in the memory block MB1. In the comparison between the caller number in the SETUP message and the caller number in the memory block MB1, however, it is unnecessary that these caller numbers coincide with each other with respect to all their digits. More concretely, in comparison between the caller numbers in the SETUP message and memory block MB1 by digits corresponding in number to the digits of the caller number registered at each index of the memory block MB1, when the caller number is registered in the memory block MB1 in the form of "01234" for example, the caller number received from the ISDN may be compared with the caller number registered in the memory block MB1 by its only upper 5 digits and all the incoming calls each having numbers "01234*" in the upper 5 digits may be sent to corresponding one of the extension telephone sets.

Although the extension telephone sets 11 to 1n have been all electronic key telephone sets in the foregoing embodiment, the present invention is not restricted to the specific example. For example, these extension telephone sets may include only standard telephone sets or may include standard and electronic telephone sets. In short, any sort of telephone set can be employed so long as it allows the input of the preset special number and the code number indicative of the completion of input of a caller number therethrough and the central controller 6 can recognize these input special and code numbers.

Further, though the caller number has been registered through the extension telephone set and this has caused the extension number of that extension telephone set to be automatically registered in the aforementioned table (memory 7) in association with the registered caller number in the foregoing embodiment, the present invention is not limited to the specific registering manner. For example, it is possible to register the extension number of one extension telephone set through another extension telephone set as the registration of a caller number. Further, it is also possible as a matter of course to provide a specific input terminal unit separately from these extension telephone sets and to input the caller number and extension number through the specific input terminal unit. The input terminal unit is illustrated by dotted lines in FIG. 1 for your reference. The input terminal unit may comprise a personal computer or the like.

What is claimed is:

1. In a network which transmits caller identification data to a called party, a method for use in a private branch exchange for automatically allocating an incoming call to a plurality of extension telephone sets, said method comprising the steps of:

previously registering in a memory table a caller number indicative of a telephone number of a potential caller and at least one extension number indicative of a telephone number of one of the plurality of extension telephone sets to which a call from the potential caller is preferably allocated;

detecting caller identification data received through the network when an incoming call is received which does not specify an extension number of one of the plurality of extension telephone sets;

determining whether the caller identification data corresponds to the caller number stored in said memory table;

identifying the caller number stored in said memory table which corresponds to the caller identification data when a determination is made that the caller identification data corresponds to the caller number stored in said memory table; and preferentially allocating the incoming call to the one of the extension telephone sets having the extension number stored in said memory table as associated with the identified caller number when the following conditions are met: (1) an incoming call is received which does not specify an extension number of one of the plurality of extension telephone sets; (2) the caller number is detected; and (3) an extension number is stored in said memory table in association with the identified caller number.

2. An extension telephone allocating method as set forth in claim 1, wherein said network is an integrated services digital network (ISDN).

3. An extension telephone allocating method as set forth in claim 1, wherein the registration of numbers in said memory table can be carried out through each of said plurality of extension telephone sets.

4. An extension telephone allocating method as set forth in claim 3, wherein when the caller number is registered in said memory table through one of the plurality of extension telephone sets, the extension number of that one extension telephone set is automatically registered in said memory table in association with the registered caller number.

5. An extension telephone allocating method as set forth in claim 4, wherein when registration of numbers in said memory table is terminated through said one extension telephone set, a dial tone signal is issued to said one extension telephone set to automatically put said one extension telephone set in a calling enable state.

6. An extension telephone allocating method as set forth in claim 1, wherein, in accordance with a predetermined rule, the incoming call is sent to another one of the plurality of extension telephone sets when the extension telephone set to which the incoming call is allocated is busy, when the detected caller identification data of the incoming call does not correspond to the caller number stored in said memory table, or when the caller identification data of the incoming call is not detected.

7. An extension telephone allocating method as set forth in claim 3, wherein when the identified caller number is associated with a plurality of extension numbers stored in said memory table, first allocating the incoming call to one of the extension numbers registered in a position in said memory table which indicates a most preferred status, and when the first allocated extension telephone set is busy, subsequently allocating the incoming call to another one of the extension numbers registered in a position in said memory table which indicates a next most preferred status.

8. An extension telephone allocating method as set forth in claim 7, wherein when the extension telephone sets having extension numbers associated with the identified caller number are all busy, one of said plurality of extension telephone sets other than the busy extension telephone sets is selected in accordance with a predetermined rule.

9. In a network which transmits caller identification data to a called party, a private branch exchange for automatically allocating an incoming call to a plurality of extension telephone sets, said private branch exchange comprising:
input means for inputting a caller number indicative of a telephone number of a potential caller;
memory means for storing and registering therein the caller number input through said input means and at least one extension number indicative of a telephone number of one of the plurality of extension telephone sets to which a call from the potential caller is preferably allocated;
detection means for detecting caller identification data received through the network when an incoming call is received which does not specify an extension number of one of the plurality of extension telephone sets;
determining means for determining whether the caller identification data corresponds to the caller number stored in said memory means;
first control means for allocating the incoming call to one of the plurality of extension telephone sets in accordance with a predetermined rule when said determining means determines that the caller identification data does not correspond to the caller number stored in said memory means, or when said detection means does not detect the caller identification data received through the network;
identifying means for identifying the caller number stored in said memory means which corresponds to the caller identification data when said determining means determines that the caller identification data corresponds to the caller number stored in said memory means;
extension-number extraction means for extracting from said memory means that at least one extension number associated with the caller number identified by said identifying means; and
second control means for preferentially allocating the incoming call to the one of the extension telephone sets having the extension number extracted by said extension-number extraction means when the following conditions are met: (1) an incoming call is received which does not specify an extension number of one of the plurality of extension telephone sets; (2) the caller number is detected by said detection means; and (3) said extension-number extraction means extracts the at least one extension number.

10. A private branch exchange having an automatic incoming-call allocating function as set forth in claim 9, wherein said network is an integrated services digital network (ISDN).

11. A private branch exchange having an automatic incoming-call allocating function as set forth in claim 9, wherein said input means corresponds to each of said extension telephone sets.

12. A private branch exchange having an automatic incoming-call allocating function as set forth in claim 11, wherein the extension number of one of the plurality of extension telephone sets through which the caller number is input, is automatically registered in said memory means in association with the caller number.

13. A private branch exchange having an automatic incoming-call allocating function as set forth in claim 12, further comprising third control means for issuing a dial tone signal to the one extension telephone set to automatically put the one extension telephone set in a calling enable state when the registration of numbers in said memory means through the one extension telephone set is terminated.

14. A private branch exchange having an automatic incoming-call allocating function as set forth in claim 9, wherein said second control means first allocates the incoming call to one of said extension telephone sets having an extension number which is the first of a plurality of extension numbers extracted through said extension-number means, and sequentially allocates the incoming call to the next extracted extension telephone set when the first allocated extension telephone set is busy.

15. A private branch exchange having an automatic incoming-call allocating function as set forth in claim 9, wherein said input means is a specific input terminal provided separately from said extension telephone sets, and wherein the caller number and the extension numbers registered in said memory means as associated with the caller number are inputted through said input terminal.

16. In a network which transmits caller identification data to a called party, a private branch exchange for automatically allocating an incoming call to a plurality of extension telephone sets, said private branch exchange comprising:

input means for inputting a caller number indicative of a telephone number of a potential caller;

memory means for storing and registering therein the caller number input through said input means and at least one extension number indicative of a telephone number of one of the plurality of extension telephone sets to which a call from the potential caller is preferably allocated;

detection means for detecting caller identification data received through the network when an incoming call is received which does not specify an extension number of one of the plurality of extension telephone sets;

determining means for determining whether the caller identification data corresponds to the caller number stored in said memory means;

first control means for allocating the incoming call to one of the plurality of extension telephone sets in accordance with a predetermined rule when said determining means determines that the caller identification data does not correspond to the caller number stored in said memory means, or when said detection means does not detect the caller identification data received through the network;

identifying means for identifying the caller number stored in said memory means which corresponds to the caller identification data when said determining means determines that the caller identification data corresponds to the caller number stored in said memory means;

extension-number extraction means for extracting from said memory means the at least one extension number associated with the caller number identified by said identifying means according to first-received digits of the caller identification data corresponding in number to the digits of the caller number stored in said memory means; and second control means for preferentially allocating the incoming call to the one of the extension telephone sets having the extension number extracted by said extension-number extraction means when the following conditions are met: (1) an incoming call is received which does not specify an extension number of one of the plurality of extension telephone sets; (2) the caller number is detected by said detection means; and (3) said extension-number extraction means extracts the at least one extension number.

17. A private branch exchange having an automatic incoming-call allocating function as set forth in claim 16, wherein said network is an integrated services digital network (ISDN).

18. A private branch exchange having an automatic incoming-call allocating function as set forth in claim 16, wherein said input means corresponds to each of said extension telephone sets.

19. A private branch exchange having an automatic incoming-call allocating function as set forth in claim 18, wherein the extension number of one of the plurality of extension telephone sets through which the caller number is input, is automatically registered in said memory means in association with the caller number.

20. A private branch exchange having an automatic incoming-call allocating function as set forth in claim 19, further comprising third control means for issuing a dial tone signal to the one extension telephone set to automatically put the one extension telephone set in a calling enable state when the registration of numbers in said memory means through the one extension telephone set is terminated.

21. A private branch exchange having an automatic incoming-call allocating function as set forth in claim 16, wherein said second control means first allocates the incoming call to one of said extension telephone sets having an extension number which is the first of a plurality of extension numbers extracted through said extension-number means, and sequentially allocates the incoming call to the next extracted extension telephone set when the first allocated extension telephone set is busy.

22. A private branch exchange having an automatic incoming-call allocating function as set forth in claim 16, wherein said input means is a specific input terminal provided separately from said extension telephone sets, and wherein the caller number and the extension numbers registered in said memory means as associated with the caller number are inputted through said input terminal.

23. In a network which transmits caller identification data to a called party, a method for use in a private branch exchange for automatically allocating an incoming call to a plurality of extension telephone sets, said method comprising the steps of:

previously registering in a memory table a caller number indicative of a telephone number of a potential caller and at least one extension number indicative of a telephone number of one of the plurality of extension telephone sets to which a call from the potential caller is preferably allocated;

detecting caller identification data received through the network when an incoming call is received which does not specify an extension number of one of the plurality of extension telephone sets;

determining whether the caller identification data corresponds to the caller number stored in said memory table;

identifying the caller number stored in said memory table which corresponds to the caller identification data when a determination is made that the caller identification data corresponds to the caller number stored in said memory table;

preferentially allocating the incoming call to one of the extension telephone sets having an extension number stored in said memory table as associated with the identified caller number when the following conditions are met: (1) an incoming call is received which does not specify an extension number of one of the plurality of extension telephone sets; (2) the caller number is detected; and (3) an extension number is stored in said memory table in association with the identified caller number; and sending the incoming call to one of the plurality of extension telephone sets in accordance with a predetermined rule when a determination is made that the caller identification data does not correspond to the caller number stored in said memory table, when the caller identification data received through the network is not detected, or when the extension telephone set to which the incoming call is preferentially allocated is busy.

24. In a network which transmits caller identification data to a called party, a method for use in a private branch exchange for automatically allocating an incoming call to a plurality of extension telephone sets, said method comprising the steps of:

previously registering in a memory table a caller number indicative of a telephone number of a potential caller and at least one extension number indicative of a telephone number of one of the plurality of extension telephone sets to which a call from the potential caller is preferably allocated;

detecting caller identification data received through the network when an incoming call is received which does not specify an extension number of one of the plurality of extension telephone sets;

determining whether the caller identification data corresponds to the caller number stored in said memory table;

identifying the caller number stored in said memory table which corresponds to the caller identification data when a determination is made that the caller identification data corresponds to the caller number stored in said memory table;

preferentially allocating the incoming call to one of the extension telephone sets having an extension number stored in said memory table as associated with the identified caller number when the following conditions are met: (1) an incoming call is received which does not specify an extension number of one of the plurality of extension telephone sets; (2) the caller number is detected; and (3) an extension number is stored in said memory table in association with the identified caller number; and when the identified caller number is associated with a plurality of extension numbers stored in said memory table, first allocating the incoming call to one of the extension numbers registered in a position in said memory table which indicates a most preferred status, and when the first allocated extension telephone set is busy, subsequently allocating the incoming call to another one of the extension numbers registered in a position in said memory table which indicates a next most preferred status.

25. In a network which transmits caller identification data to a called party, a method for use in a private branch exchange for automatically allocating an incoming call to a plurality of extension telephone sets, said method comprising the steps of:

previously registering in a memory table a caller number indicative of a telephone number of a potential caller and at least one extension number indicative of a telephone number of one of the plurality of extension telephone sets to which a call from the potential caller is preferably allocated;

detecting caller identification data received through the network when an incoming call is received which does not specify an extension number of one of the plurality of extension telephone sets;

determining whether the caller identification data corresponds to the caller number stored in said memory table;

identifying the caller number stored in said memory table which corresponds to the caller identification data when a determination is made that the caller identification data corresponds to the caller number stored in said memory table;

preferentially allocating the incoming call to one of the extension telephone sets having an extension number stored in said memory table as associated with the identified caller number when the following conditions are met: (1) an incoming call is received which does not specify an extension number of one of the plurality of extension telephone sets; (2) the caller number is detected; and (3) an extension number is stored in said memory table in association with the identified caller number;

when the identified caller number is associated with a plurality of extension numbers stored in said memory table, first allocating the incoming call to one of the extension numbers registered in a position in said memory table which indicates a most preferred status, and when the first allocated extension telephone set is busy, subsequently allocating the incoming call to another one of the extension numbers registered in a position in said memory table which indicates a next most preferred status; and when the extension telephone sets having said extension numbers associated with the identified caller number are busy, selecting one of said plurality of extension telephone sets other than the busy extension telephone sets in accordance with a predetermined rule.

* * * * *